(No Model.)

D. PATTEE.
STEAM ENGINE.

No. 337,860. Patented Mar. 16, 1886.

Witnesses:
M. H. Anderson
R. H. Orwig

Inventor:
Davis Pattee,
By Thomas G. Orwig, Atty.

UNITED STATES PATENT OFFICE.

DAVIS PATTEE, OF DES MOINES, IOWA.

STEAM-ENGINE.

SPECIFICATION forming part of Letters Patent No. 337,860, dated March 16, 1886.

Application filed August 25, 1885. Serial No. 175,320½. (No model.)

*To all whom it may concern:*

Be it known that I, DAVIS PATTEE, a citizen of the United States of America, and a resident of Des Moines, in the county of Polk and State of Iowa, have invented new and useful Improvements in Steam-Engines, of which the following is a specification.

My object is to simplify the construction and improve the operation of that class of engines known as "direct-acting" and "reciprocating;" and my invention consists in the construction and combination of a rotating slide-valve with a straight cylinder, a driving-shaft, a chain and chain-wheels, and mechanism for reversing the engine, as hereinafter set forth, pointed out in my claims, and illustrated in the accompanying drawings, in which—

Figure 1:
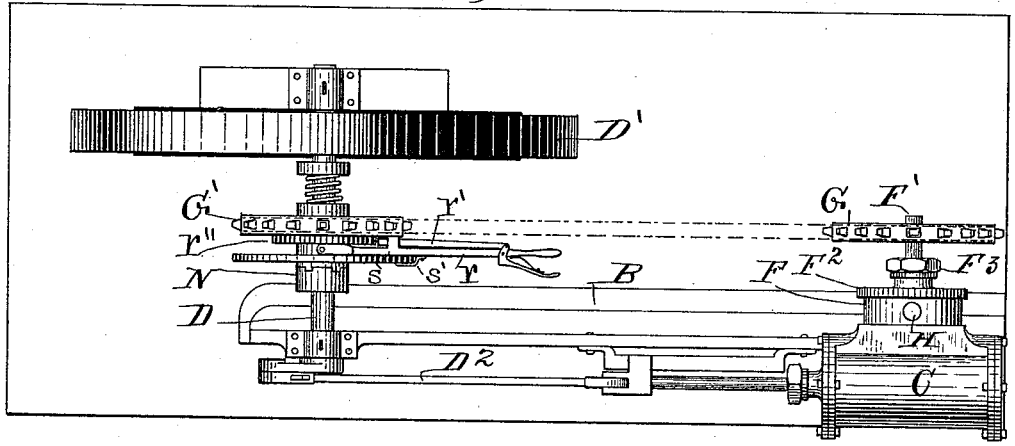
Figure 2:
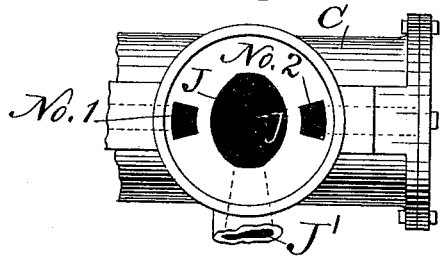
Figure 3:
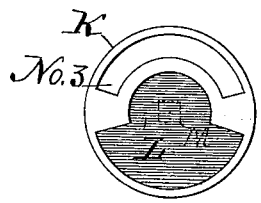

Figure 1 is a top plan view; Fig. 2, a side view of the valve-chamber on a section of the cylinder, and Fig. 3 a face view of the rotary sliding valve.

A represents the platform upon which the engine is mounted.

B is the metal base of the engine, fixed on top of the platform.

C is a straight cylinder fixed on the top and end of the base.

D is the driving-shaft in bearings at the opposite end of the base.

D' is a balance and belt wheel fixed to the shaft.

D² is a piston-rod connected with the driving-shaft by means of a crank in a common way.

F is the valve-chamber formed integral with the cylinder C.

F' is the valve-stem supported at its outer end by a post or bearing fixed to the platform.

F² is a cap screwed on the open end of the valve-chamber.

F³ is a stuffing-box on the outside and center of the cap, through which the valve-stem extends.

G is a chain-wheel fixed to the valve-stem F'.

G' is a corresponding wheel fixed to the driving-shaft D.

Nos. 1 and 2 are induction-ports, through which steam passes from the valve-chamber to the opposite ends of the cylinder as required to impart a reciprocating motion to a piston in the cylinder.

H is the induction-port, through which steam enters the valve-chamber from a conveying-tube that extends to a steam-generator.

J is an exhaust-chamber, that opens downward, and has an exhaust-tube, J', connected therewith.

K is a circular slide-valve, adapted to rotate in the valve-chamber F, as required to alternately open and close the ports Nos. 1 and 2.

No. 3 is a port in the valve near its circumference, through which steam will pass from the valve-chamber into the cylinder, and at each revolution through one of the ports.

L is a chamber formed in the inside face of the valve, into and through which the exhaust-steam escapes from the cylinder through one of the ports Nos. 1 and 2, as the port No. 3 coincides therewith at each revolution of the valve.

M is an angular cavity in the outside face of the valve K, into which is fitted the end of the valve-stem F, as required to impart motion to the valve.

N represents a clutch on the shaft D, by means of which the chain-wheels G and G', and a chain extending over them, may be thrown out of gear as required to arrest or reverse the motion of the engine.

Figure 4:
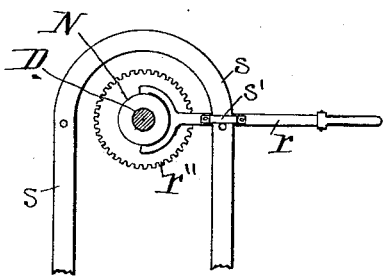

$r$ is a reversible lever carrying a pawl, $r'$, adapted to engage a ratchet-wheel, $r''$, fixed to the shaft D. The lever $r$ is fixed to the clutch N, and connected with an arched guide, $s$, by means of a loop, $s'$, as clearly shown in Fig. 4.

From the description of the construction and function of each element the unitary actions of all the parts and the practical operation of my complete invention will be obvious to persons familiar with steam-engines.

I claim as my invention—

1. In a steam-engine, the combination of a rotary slide-valve, K, having an elongated port, No. 3, near its circumference, and a chamber, L, with a straight cylinder having a valve-chamber at its side and center, steam-ports Nos. 1 and 2, and an exhaust-chamber, J, a stem, F, a shaft, D, chain-wheels G and G², a lever, $r$, carrying a pawl, a ratchet-wheel, $r''$, and a clutch, N, to operate in the manner set forth, for the purposes stated.

2. The combination of the shaft D, having a fixed driving-wheel, the lever $r$, carrying a pawl, $r'$, and loop $s'$, the ratchet-wheel $r''$, the clutch N, and the arched guide *s*, substantially as shown and described, to operate in the manner set forth, for the purposes stated.

3. The improved reciprocating steam-engine, composed of a straight cylinder having a valve-chamber at its side and center, a driving-shaft having a crank connected with the piston in the cylinder, a rotating slide-valve having a stem extending parallel with the driving-shaft and connected therewith by means of chain-wheels and a chain, a ratchet-wheel fixed to the driving-shaft, a sliding clutch on the same shaft, a lever carrying a pawl and a loop, and a fixed arched lever-guide, to operate in the manner set forth.

DAVIS PATTEE.

Witnesses:
R. H. ORWIG,
THOMAS G. ORWIG.